UNITED STATES PATENT OFFICE.

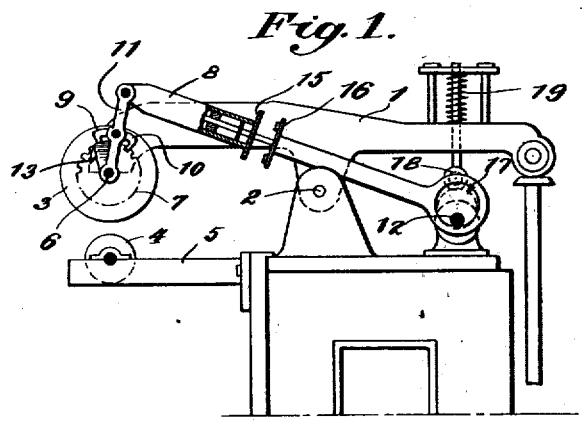

EDMUND SCHRÖDER, OF BERLIN, GERMANY.

ELECTRIC SEAM-WELDING MACHINE.

1,427,231.    Specification of Letters Patent.    Patented Aug. 29, 1922.

Application filed March 15, 1920. Serial No. 366,176.

*To all whom it may concern:*

Be it known that I, EDMUND SCHRÖDER, engineer, a citizen of the German Republic, residing at Nos. 48–51 Maybach-Ufer, Berlin, Germany, have invented certain new and useful Improvements in Electric Seam-Welding Machines (for which I have filed applications in Germany June 12, 1918; Austria, Aug. 19, 1918; and Hungary, Aug. 28, 1918), of which the following is a specification.

This invention relates to electric seam welding machines and it is an improvement upon machines of the kind described in my co-pending application Serial No. 329629, filed Oct. 9, 1919.

In these prior arrangements a roller electrode, bearing on the seam to be welded, is successively turned a predetermined short distance. After each of these part-rotations has been accomplished, the circuit containing the roller electrode is closed. Welding thus takes place while this electrode is at rest on the seam which is successively subjected throughout its entire length to such intermittent action.

In accordance with the present invention, which is especially for welding longitudinal seams of tubes, the action of the device is mainly as follows:

The roller electrode, or any combination of such electrodes, is moved so that the seam to be welded shall be advanced a short distance only, such, for example, as 10 millimeters, when the seam is acted upon by this roller returning on it a shorter distance, viz. 8 millimeters for instance, in the manner of the tube rolling or Perrins process. During this short return movement welding takes place. To such end the primary circuit is made to depend on the motion of the roller electrode so as to become closed only on the return movement thereof.

Such mode of working does away with treating the overlapped edges in any way preparatory to the subsequent welding, for the seam is preliminarily rolled before each welding, as will be fully understood from the following description, the so treated portion of the seam then getting welded up to the portion thereof before finished by welding. In order to prevent any material from becoming transferred to the end of the seam by the action of the roller, the latter may be brought to bear with little pressure on the seam when travelling the larger distance of its rolling motion, while on the shorter return movement of the roller, i. e., on welding, the pressure most advantageous to the welding is adopted. In the case of thicker material, however, the reverse procedure will often be preferable. A higher pressure should then be employed in connection with the larger distance of the roller motion, i. e. a pressure adapted to connect the edges of the thicker sheet metal to each other to some extent, while for the return movement of the roller the pressure most advantageous to welding should be utilized. This pressure will in most cases be less than the former. Thus, especially in the event of sheet metal presenting a clean metallic surface, or of material of small contact resistance, it will frequently occur that thicker sheet metal requires a larger pressure for compressing the seam than for welding it.

In the accompanying drawings which diagrammatically illustrate the invention by way of example, Fig. 1 is an elevation showing the means for moving the roller electrode; Fig. 2 represents part of Fig. 1 drawn to a larger scale; Fig. 3 is an elevation illustrating the mode of working of the novel machine as designed for welding tubes; Fig. 4 is an elevation showing the main parts of a completed machine; Fig. 5 is a sectional elevation of a switch for automatically closing the circuit used for welding; Figs. 6 to 8 are sectional views representing combinations of roller electrodes.

Like numerals of reference denote like parts in the several views.

As shown in Fig. 1, a beam 1 fulcrumed at 2 carries a roller electrode 3. A counter roller 4 is mounted in an arm 5. On the axle 6 of the roller 3 a ratchet wheel 7 is fixed. Two pawls 9, 10, carried by a rocking lever 11, are to engage the ratchet wheel 7 alternately. This lever is free to swing on the axle 6 and is moved from the main shaft 12 by a rod 8 attached to an eccentric or crank of this shaft. The point at which the rod 8 is jointed to the lever 11 can be adjusted with regard to the axle 6 in order to regulate the distance the lever is moved in either direction. In order that these two distances be different from one another and at the same time to operate the roller 3 on the principle of the Perrins process, the ratchet wheel and pawls are combined with the following arrangement more fully seen from Fig. 2.

Beside the ratchet wheel 7 a segment 13 is adjustable along the circumference thereof. Such segment is fixed on the axle 6 by a screw 14. On the circumferential face of the segment 13 the pawls 9, 10, being broader than the wheel 7, are adapted to rest, and when so doing will be out of engagement with this wheel. By adjusting the segment 13 so that the pawl 9 shall bear on it, this pawl will not act on the ratchet wheel 7 until it leaves the segment, so that the rotation the pawl 9 imparts to the wheel 7 will be shorter than the one imparted to the wheel by the pawl 10. The ratchet wheel 7 and roller 3 will thus be advanced in the direction of rotation in which the pawl 10, not influenced by the segment 13, is active. By adjusting the latter so as to sustain the pawl 10 along part of its angular path, the ratchet wheel 7 and roller 3 are caused to advance in the opposite direction to the former.

In order that the circuit shall in any case become active during either one or the other phase of movement of the roller 3, the rod 8 is made in two alining parts each fitted with contact pieces such as 15 or 16, respectively, forming a primary switch for the circuit containing the roller electrode 3 and counter roller 4. The arrangement shown is such that the current will be active during any one of the shorter distances travelled by the roller 3.

An eccentric 17 fitted to the main shaft 12 is to act on a roller 18 so as to increase the pressure the roller electrode exerts on welding. Such increase in pressure can be regulated by means of an adjustable spiral spring such as 19.

The procedure in welding longitudinal seams of tubes by means of the novel machine is as follows:

The tube t is conducted to the roller electrode 3 in an open state, as will be seen from Fig. 3. The other electrode is a mandrel 20 carried by a wedge-shaped support 21. The seam is closed, after having passed this support, by side rollers (not shown) acting on the tube in a well-known manner so as to bend together the edges of the tube. The latter is now intermittently moved, i. e. advanced a short distance and then stopped for a short interval. The tube being at rest, the roller electrode 3 is moved in the direction of the arrow I while bearing on the seam which thus is welded. It will be understood that the tube is at rest on the mandrel during welding. As soon as the roller 3 is about in the position shown dotted it is relieved of the pressure exerted by the eccentric 17 and roller 18 on the beam 1 so that the mandrel electrode 20 which is somewhat smaller in diameter than the tube will extend freely into the clear space thereof. The tube is now again advanced in the direction of the arrow II. The roller 3 shares in such movement in order to begin the subsequent welding exactly at the point where the welding just effected has been finished.

It will appear from the foregoing description that the entire seam is successively welded in short lengths by means of a stationary mandrel electrode and travelling roller electrode. The tube experiencing no friction on moving along the mandrel 20, the latter is not subjected to wearing away. If this mandrel is rotatable on its longitudinal axis it can be turned by hand or by means of any suitable device so as to present successively fresh portions of its surface for the tube to rest upon under the pressure exerted by the roller 3. In this way the whole surface of the mandrel is equally utilized. No difficulty will be found in cooling the mandrel.

In the completed machine shown in Fig. 4, a main shaft 41 is fitted with an eccentric or cam 23. Such cam is designed to act on a lever 24 carrying a pawl 25. Engaged by this pawl is a rack 26 connected to the tube t to be welded. By the rotation of the cam 23 the lever 24 and pawl 25 are caused to successively shift the rack 26 and thus the tube in the direction of the arrow II. At the same time the roller 3 is reciprocated either in the manner described with reference to Figs. 1 and 2, i. e. by means of a ratchet wheel and pawls, or directly by a disk crank or cam, as indicated in Fig. 4. Another cam mounted on the main shaft 41 is disposed to act on a roller 27 so as to lift off the roller electrode 3 from the seam in order to permit the tube to be displaced by the means described. At the same time a roller 22 is caused by the cam 23 to lift the tube to such an extent that the tube shall surround the mandrel electrode freely.

Disposed on the main shaft 41 is a switch 28 (Fig. 5) which causes the circuit containing the roller electrode 3 and mandrel electrode 20 to be closed only during the time the roller 3 moves in the direction of the arrow I while bearing on the seam of the tube. To such end the switch has a contact segment 29 to coact with a contact roller 30 and arranged so that the described action shall take place. The device 28 may also be an oil-break switch.

The principle herein disclosed can also be adopted for welding longitudinal seams of tubes delivered to the machine in an already closed state. This is illustrated in Figs. 6 to 8. The closed tube here is filled out by a mandrel 40 which is not included in the said circuit, i. e. does not serve as an electrode.

In such case two roller electrodes 31, 32, shown in Fig. 6, may be disposed so that one of them, viz., 31, shall operate immediately beside the seam and the other, 32, bear upon the seam while subjected to pressure exerted by any suitable means, such, for example, as those described with reference to Fig. 4.

According to Fig. 7 two roller electrodes 33, 34 are arranged to run beside the overlapped seam, while a third roller 35 which is non-conductive is to transmit the welding pressure to the seam.

As shown in Fig. 8, two roller electrodes 36, 37, running beside the seam and forming one pole for welding, may be employed in connection with a roller 38 acting on the upturned edges of the seam and constituting the other pole.

In all the arrangements represented in Figs. 6 to 8 the tube to be welded is supported by a roller 39.

The working after the manner of the Perrins process is preferably effected in the three latter cases by moving the tube together with the mandrel, contained in it, the predetermined distance before referred to, when the pressure employed in welding and the electric current get active as soon as the mandrel free to slide within the tube begins to return, whereupon it will be again advanced in company with the tube the said distance. The mandrel thus need only equal in length such distance. It is held only by a rod that corresponds to the length of the tube and is by means of such rod caused to return within the tube while the latter is at rest.

I claim:

1. In an electric seam welding machine, the combination of a roller electrode, a mandrel-shaped electrode, and a circuit for the two, with means for moving the work piece with its overlapped seam edges through between these electrodes and along the mandrel electrode, means for moving the roller electrode in company with the work piece intermittently, means for a return movement of the roller electrode, means for pressing the latter against the seam of the work piece, and means for closing the said circuit on the return movement of the roller electrode, substantially as set forth.

2. In an electric seam welding machine, the combination of a roller electrode, a mandrel-shaped electrode, and a circuit for the two, with means for moving the work piece with its overlapped seam through between these electrodes and along the mandrel electrode, a main shaft, means geared to the latter to advance the work piece intermittently means geared to such main shaft to advance and return the roller electrode alternately, means for pressing the roller electrode against the seam, and means for closing the said circuit on the return movement of the roller electrode, substantially as set forth.

3. In an electric seam welding machine, the combination of a roller electrode, a mandrel-shaped electrode, and a circuit for the two, with means for moving the work piece with its overlapped seam through between these electrodes and along the mandrel electrode, a main shaft, a cam on the latter, a lever acted upon by such cam, a pawl carried by this lever, a rack adapted for attachment to the work piece and engaged by the said pawl, an eccentric on the said main shaft, a rod connecting this eccentric with the roller electrode, means operated by the said main shaft for pressing the roller electrode against the seam, and means for closing the said circuit on the return movement of the roller electrode, substantially as set forth.

4. An electric welding machine, comprising in combination, a pressure-exerting electrode, a work-supporting electrode and a circuit for the two, means for collectively and intermittently moving the work-piece and pressure-exerting electrode for predetermined distances, and other means for moving the pressure-exerting electrode over the seam of the work-piece whereby to weld the seam.

5. An electric welding machine, comprising in combination, a pressure-exerting electrode, a work-supporting electrode, and a circuit for the two, means for collectively and intermittently moving the work-piece and pressure-exerting electrode for predetermined distances, and other means for moving said pressure-exerting electrode over the seam of the work-piece for a distance less than the first mentioned movement thereof whereby to weld said seam.

6. An electric welding machine, comprising in combination, a pressure-exerting electrode, a work-supporting electrode, and a circuit for the two, means for collectively and intermittently moving the work-piece and pressure-exerting electrode for predetermined distances, a work-piece supporting member operable upon movement of the work-piece for raising the same free of the work-supporting electrode and subsequently disengaging the same upon completion of movement of the work-piece, and other means for moving the pressure-exerting electrode over the seam of the work-piece for a distance less than its first movement, whereby to weld said seam.

7. An electric welding machine, comprising in combination, a pressure-exerting electrode, a work-supporting electrode, and a circuit for the two, means for collectively and intermittently moving the work-piece and pressure exerting electrode for predetermined distances, circuit-breaking means operable upon said movement of the work-piece and pressure-exerting electrode for breaking the circuit including the two electrodes, and other means for moving the pressure-exerting electrode in an opposite direction for a distance less than that of its first movement over the seam of the work-piece whereby to weld the seam.

8. An electric welding machine, comprising in combination, a pressure-exerting electrode, a work-supporting electrode, a circuit for the two, means for collectively and intermittently moving the work-piece and pressure-exerting electrode for predetermined distances, said work-piece during such movement being free of the work-supporting electrode and the pressure-exerting electrode, and other means for re-engaging the pressure-exerting electrode with the seam of the work-piece and moving such electrode in an opposite direction thereover for a distance less than the first movement thereof whereby to weld said seam.

9. An electric welding machine, comprising in combination, a pressure-exerting electrode, a work-supporting electrode, a circuit for the two, means for collectively and intermittently moving the work-piece and pressure-exerting electrode for predetermined distances, during which movement, the work-piece is disengaged from each of the electrodes, circuit-breaking means included in said circuit for automatically breaking the same during said movement of the work-piece and pressure-exerting electrode, and other means for re-engaging the pressure-exerting electrode with the work-piece and moving the same in an opposite direction thereover for a distance less than its first movement whereby to weld the seam in such work-piece.

10. An electric welding machine, comprising opposed electrodes, a circuit for the two, means for engaging two of said electrodes with the seam of the work-piece under adjustable pressure, other means for rotating said last mentioned electrode for a predetermined distance in one direction and then a lesser predetermined distance in the opposite direction, and circuit-breaking means included in said circuit for automatically breaking the same upon the first rotation of said electrode and then making the same upon the second rotation thereof.

In testimony whereof I affix my signature.

EDMUND SCHRÖDER.